(12) United States Patent
Cho et al.

(10) Patent No.: US 9,963,067 B1
(45) Date of Patent: May 8, 2018

(54) STRUCTURE AND METHOD OF FOAM-INJECTION MOLDING INCLUDING EL SHEET

(71) Applicant: SEOYON E-HWA CO., LTD., Seoul (KR)

(72) Inventors: Ji Hyun Cho, Asan (KR); Sung Won Lee, Asan (KR); Seung Yeong Kim, Asan (KR)

(73) Assignee: SEOYON E-HWA CO., LTD., Seoul (KR)

( * ) Notice: Subject to any disclaimer, the term of this patent is extended or adjusted under 35 U.S.C. 154(b) by 0 days. days.

(21) Appl. No.: 15/478,780

(22) Filed: Apr. 4, 2017

(30) Foreign Application Priority Data

Oct. 28, 2016 (KR) .................. 10-2016-0141876
Oct. 28, 2016 (KR) .................. 10-2016-0141899
Oct. 28, 2016 (KR) .................. 10-2016-0141937

(51) Int. Cl.
| | |
|---|---|
| *B60Q 3/54* | (2017.01) |
| *B29C 45/14* | (2006.01) |
| *H05B 33/12* | (2006.01) |
| *H05B 33/10* | (2006.01) |
| *B60Q 3/60* | (2017.01) |
| *B60R 13/02* | (2006.01) |
| *B29K 21/00* | (2006.01) |
| *B29K 105/04* | (2006.01) |

(52) U.S. Cl.
CPC ............ *B60Q 3/54* (2017.02); *B29C 45/1418* (2013.01); *B29C 45/14795* (2013.01); *B60Q 3/60* (2017.02); *B60R 13/0243* (2013.01); *H05B 33/10* (2013.01); *H05B 33/12* (2013.01); *B29K 2021/003* (2013.01); *B29K 2105/04* (2013.01); *B29K 2623/12* (2013.01); *B29K 2995/0036* (2013.01); *B60Q 2500/10* (2013.01)

(58) Field of Classification Search
CPC ........ B60Q 3/54; B60Q 3/60; B60Q 2500/10; B29C 45/1418; B29C 45/14795; B60R 13/0243; B29K 2995/0036; B29K 2021/003; B29K 2105/04; B29K 2623/12; H01L 51/5237; H01L 51/524; H01L 51/5253; H05B 33/12; H05B 33/33; H05B 33/04
See application file for complete search history.

(56) References Cited

U.S. PATENT DOCUMENTS

| | | | | |
|---|---|---|---|---|
| 3,177,391 | A * | 4/1965 | Devol | H05B 33/04 156/285 |
| 9,446,709 | B2 * | 9/2016 | Salter | B60Q 3/54 |
| 2001/0030871 | A1 * | 10/2001 | Anderson, Jr. | H01H 9/18 362/488 |
| 2010/0195337 | A1 * | 8/2010 | Heite | H05B 33/22 362/459 |
| 2010/0214521 | A1 * | 8/2010 | Togashi | G02F 1/1339 349/153 |

* cited by examiner

*Primary Examiner* — Joseph L Williams
*Assistant Examiner* — Jose M Diaz
(74) *Attorney, Agent, or Firm* — Sughrue Mion, PLLC

(57) ABSTRACT

Provided is a structure of foam-injection molding including an EL sheet. The structure includes: a base material; an electro luminescence(EL) sheet which is able to emit a light, and which is disposed on an upper side of the base material; a foam layer disposed on an upper side of the EL sheet; and a skin layer disposed on an upper side of the foam layer.

13 Claims, 5 Drawing Sheets

STRUCTURE AND METHOD OF FOAM-INJECTION MOLDING INCLUDING EL SHEET

BACKGROUND OF THE INVENTION

Field of the Invention

The present disclosure relates to a structure and a method of foam-injection molding including an EL sheet, and more particularly, to a structure and a method of foam-injection molding including an EL sheet for maximizing the soft feeling of a vehicle interior material and enhancing an interior decoration effect.

Description of the Related Art

Generally, a vehicle interior material is a part used for interior decoration of a vehicle, which is integrally formed as a second member such as a resin is pressed onto a first member such as a fabric to be mounted on the vehicle.

Conventional vehicles are regarded as merely a kind of transportation means, and the beauty or the feel of the vehicle interior material is not seriously considered. However, at present, vehicles are considered as an article that expresses the individuality of a user beyond the role of the vehicle as a means of transportation.

In this trend, the interior materials of the vehicle are gradually improved to satisfy the beauty and the emotional quality desired by user. In particular, among the interior materials of the vehicle, various shapes of a door trim have been developed to achieve beauty.

Korean Unexamined Patent Application Publication No. 10-2007-0039687 discloses that a separate illumination is provided adjacent to a part of a plurality of parts mounted in a door trim to improve discrimination and to provide a sense of beauty to a user.

Referring to FIG. 1 of this document, an illumination unit 12 is provided on an upper side of a handle unit 10 so that a user may easily identify the handle unit 10 and, at the same time, recognize the beauty of the handle unit 10 when the surrounding environment of the vehicle is dark, for example, at night or when it is very cloudy.

However, in the case of using the illumination unit 12 as described above, there is a problem that the night view visibility is deteriorated as the user is affected by a glare phenomenon. In addition, there is a problem that the beauty of the handle unit 10 is deteriorated against expectation due to complicatedness of the illumination unit 12. Hence, it is required to develop a more improved vehicle door trim.

SUMMARY OF THE INVENTION

The present disclosure has been made in view of the above problems, and provides a structure and a method of foam-injection molding including an EL sheet which can enhance the beauty of a vehicle interior material and enhance the emotional quality of a user.

In accordance with an aspect of the present disclosure, a structure of foam-injection molding includes: a base material; an electro luminescence (EL) sheet which is able to emit a light, and which is disposed on an upper side of the base material; a foam layer disposed on an upper side of the EL sheet; and a skin layer disposed on an upper side of the foam layer.

The skin layer is formed of a material capable of adjusting transmittance.

The structure further includes a surface treatment layer disposed on an upper side of the skin layer.

The surface treatment layer is formed of a material capable of adjusting transmittance.

The skin layer is formed by performing foaming.

The foam layer is formed of a thermoplastic elastomer (TPE) material.

The EL sheet is installed at one side of an interior of a door trim of a vehicle to emit a light when a user gets on or off the vehicle.

A power line is embedded in an upper end of the base material.

The base material is formed of a hard material.

The foam layer contains an additive for preventing exposure of the base material or the EL sheet when the EL sheet does not emit a light.

The additive is a fluorescent material or a polarizing material.

In accordance with another aspect of the present disclosure, a method of foam-injection molding includes: forming a base material; forming an electroluminescence (EL) sheet capable of emitting light on an upper side of the base material; forming a foam layer on an upper side of the EL sheet; and forming a skin layer on an upper side of the foam layer.

The skin layer is formed by a foam injection.

The skin layer is preheated and embossed on an inside of the mold.

The base material and the EL sheet are mounted inside a mold after the EL sheet is bonded to the base material.

BRIEF DESCRIPTION OF THE DRAWINGS

The objects, features and advantages of the present disclosure will be more apparent from the following detailed description in conjunction with the accompanying drawings, in which.

DETAILED DESCRIPTION OF EXEMPLARY EMBODIMENTS

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

Figure 1:
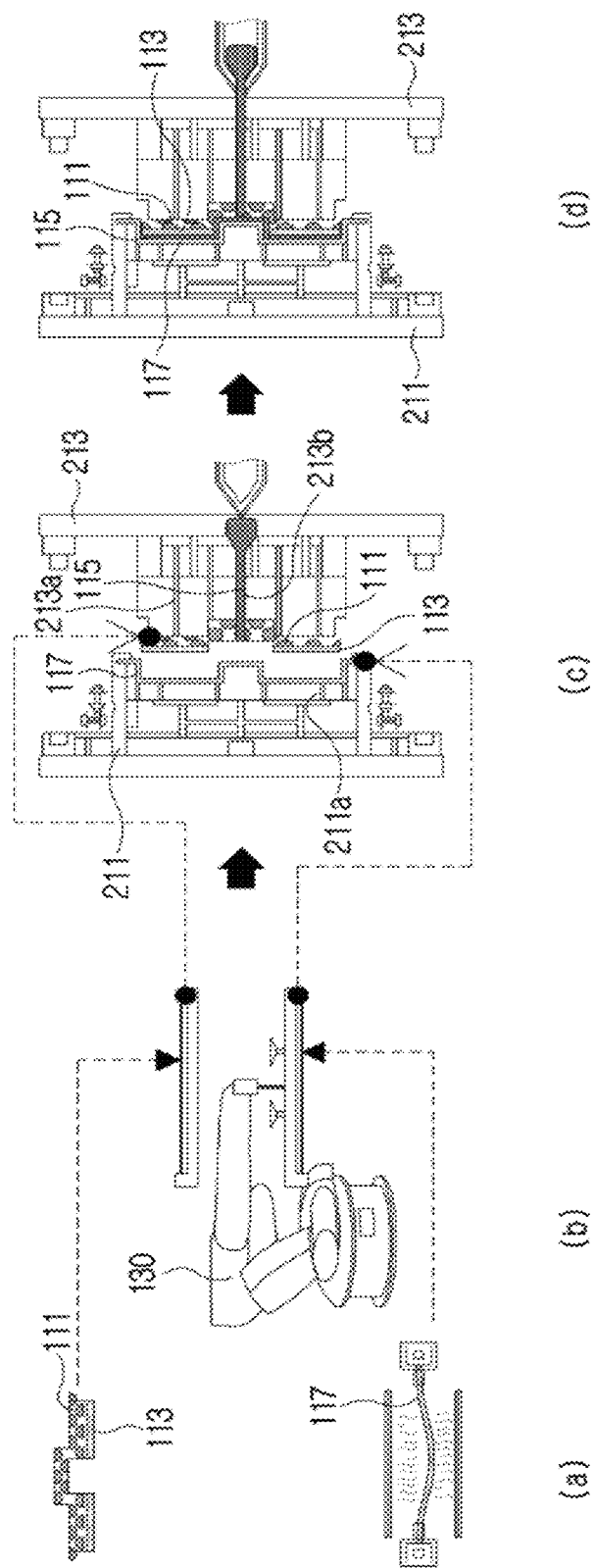
FIG. 1 illustrates a manufacturing process of a foam-injection molding structure including an EL sheet according to an exemplary embodiment of the present disclosure.

FIG. 1 illustrates a manufacturing process of a foam-injection molding structure including an EL sheet according to an exemplary embodiment of the present disclosure.

As shown in FIG. 1, a foam-injection molding structure including an EL sheet according to an embodiment of the present invention may include a preparation step A, a preforming step C, and an injection foaming step D.

The preparation step A may include a process of preheating a skin layer for heating in advance before mounting on a mold, and a process of adhering a base material and an electro luminescence (EL) sheet.

In this preparation step A, a base material 111 may be formed, and an EL sheet 113 capable of emitting light may be formed on an upper portion of the base material 111.

In addition, a skin layer preheating process may be performed so that a skin layer 117 may be mounted in the mold to achieve an embossing transfer which forms a desired pattern.

Next, the skin layer 117 and the base material 111 to which the EL sheet 113 is adhered may be transferred by a robot(step B).

Next, the skin layer 117 and the base material 111 to which the EL sheet 113 is adhered may be loaded in a first mold 211 and a second mold 213, respectively, by the robot (step C).

At this time, the preheated skin layer 117 may be sucked by a suction hole 211a provided in the first mold 211 to be vacuum-adsorbed on the surface of the first mold 211 such that an embossing transfer is achieved depending on the shape of the surface of the first mold 211.

In addition, the base material 111 to which the EL sheet 113 is adhered may be sucked by a suction hole 213a provided in the second mold 213 to be attached in the second mold 213.

In the state in which the skin layer 117 and the base material 111 to which the EL sheet 113 is adhered are inserted in the first mold 211 and the second mold 213, the first mold 211 may move to the second mold 213 side. Then, a foam material may be injected along an injection hole 213b formed in the second mold 213 or may be foamed after the injection such that a foam layer 115 is formed (step C).

According to a method of a foam-injection molding including an EL sheet of an exemplary embodiment of the present disclosure, through the above mentioned process, the EL sheet 113 may be formed on an upper side of the base material 111, the foam layer 115 may be formed on an upper side of the EL sheet 113, and the skin layer 117 may be formed on an upper side of the foam layer 115.

Here, the foam layer 115 may be formed of a thermoplastic elastomer (TPE) material.

The thermoplastic elastomer (TPE) has a property that a rubber (elastomer) property is combined with the excellent molding properties of plastics, and thus has both properties of a plastic (thermoplastic) and a rubber (elastomer). Like the thermoplastic resins, the TPE becomes plastic when it is heated and becomes elastic when it is cooled again.

That is, the TPE may exhibit elastomeric properties which is similar to elastomers, but it may be repetitively deformed and restored like thermoplastic resins, thus allowing easy thermoplastic molding, short cycle time, low energy consumption, thermal stability, and double or triple molding. Therefore, it may have advantages such as assembly cost reduction, combination of two materials (hard-soft component), 100% recyclability, and various coloring options including color effect for advanced design. Accordingly, the present embodiment adopts this for the foam layer 115.

Figure 2:
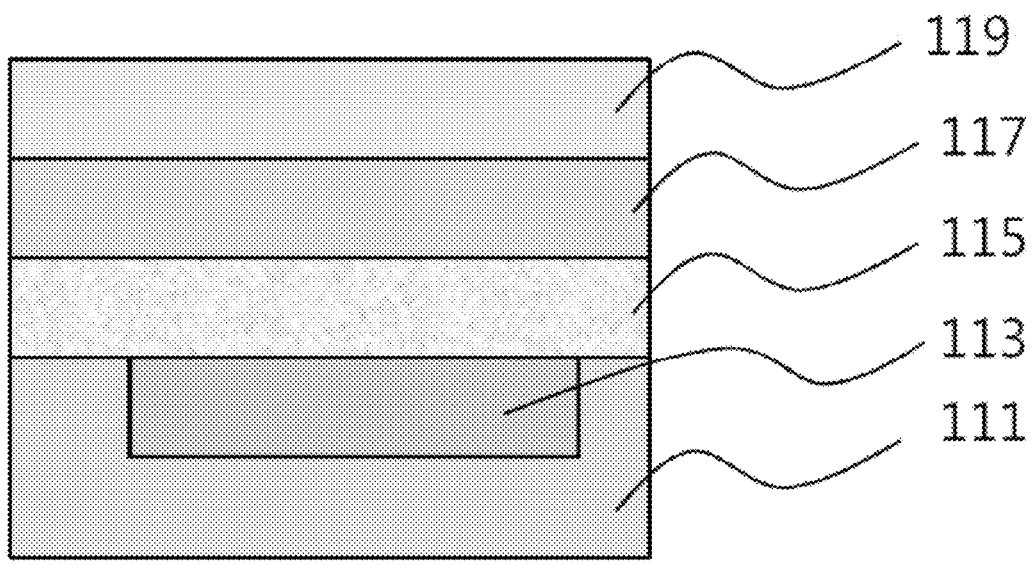
FIG. 2 illustrates a foam-injection molding structure including an EL sheet according to an exemplary embodiment of the present disclosure.

FIG. 2 illustrates a foam-injection molding structure including an EL sheet according to an exemplary embodiment of the present disclosure.

Referring to FIG. 2, the foam-injection molding structure 100 including an EL sheet according to an exemplary embodiment of the present disclosure may include the base material 111, the EL sheet 113 disposed on the upper side of the base material 111, the foam layer 115 disposed on the upper side of the EL sheet 113, and the skin layer 117 disposed on the upper side of the foam layer 115.

Further, it may further include a surface treatment layer 119 disposed on the upper side of the skin layer 117.

Here, the skin layer 117 or the surface treatment layer 119 may be formed of a material capable of adjusting the transmittance.

The transmittance adjustment may be performed by using a material whose transmittance varies depending on the amount of light, or a material whose light transmittance varies depending on external pressure or voltage. In another embodiment, a specific additive may be added to the skin layer 117 or the surface treatment layer 119 to adjust the transmittance to a desired level.

In addition, the skin layer 117 according to an exemplary embodiment of the present disclosure may be foamed so that a soft touch can be felt.

In the foam-injection molding structure including the EL sheet according to an exemplary embodiment of the present disclosure, the foam layer 115 may play an important role in controlling the soft feeling, and its thickness may be determined in consideration of both moldability and soft feeling.

The foam layer 115 may be implemented through a general injection and the foam layer 115 may be formed with various thicknesses through various foaming methods such as chemical foaming or physical foaming so as to improve the soft feeling. In this case, the thicknesses may be approximately 1 to 2 mm. In order to further enhance the soft feeling, the foam layer 115 may be formed with a thickness of 3 to 5 mm. The foam thickness may be determined according to the design and the light emission range, in consideration of the transmittance and scattering of the EL film light source depending on the size of the foam cell,.

Meanwhile, the EL sheet 113 is a light-emitting layer and it is preferable that a thickness of the EL sheet 113 is about 0.3 mm. Since an ITO film made of a PET material is usually used as a protective film of the EL sheet, a PP film may be applied as a protective film for securing adhesion property between the non-polar TPE foam layer and the PPF base material.

The foam-injection molding structure 100 including the EL sheet according to an exemplary embodiment of the present disclosure may be configured in such a manner that the EL sheet 113 is installed as a part of the interior material of the vehicle and emits light under various conditions.

In one embodiment, the EL sheet 113 may be installed at one side of the interior of the vehicle door trim so as to emit light when the user gets on or gets off the vehicle, thereby improving convenience for the user. That is, the EL sheet 113 may be mounted so as to increase the discrimination when the surrounding of the vehicle is dark, for example, at night or when it is very cloudy, thereby improving the interior decoration of the vehicle.

Figure 3:
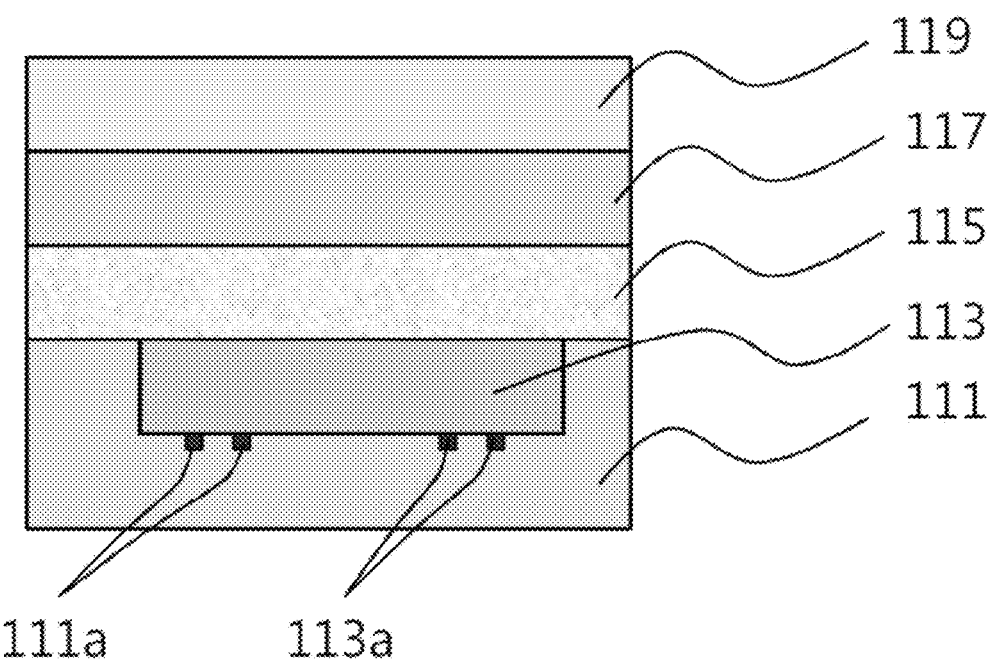
FIG. 3 illustrates a foam-injection molding structure including an EL sheet according to another exemplary embodiment of the present disclosure.

FIG. 3 illustrates a foam-injection molding structure including an EL sheet according to another exemplary embodiment of the present disclosure, in which a power line is embedded.

Hereinafter, another exemplary embodiment of the present disclosure is described with reference to FIG. 3. The components having the same reference numerals as those in an embodiment are the same components performing the same function and the description thereof is omitted.

The base material 111 may be formed of a rigid material and a buried portion 111a may be formed in an upper end of the base material 111 so that a power supply line 113a may be embedded.

The EL sheet 113 may be arranged in the upper side of the base material 111 and the power supply line 113a may be buried in the buried portion 111a.

As described above, the foam-injection molding structure including an EL sheet according to another exemplary embodiment of the present disclosure may be configured in such a manner that the power line 113a is embedded in the base material 111 which is not a flexible but a rigid material. Accordingly, the power line 113a may be firmly mounted and may not be exposed to the outside.

The method of embedding the power line 113a in the base material 111 may be formed in various ways.

For example, the EL sheet 113 may be inserted into a mold while the power supply line 113a is disposed in the lower side, and the base material 111 may be injected to the lower side of the EL sheet 113 to integrally mold.

According to another method, a mold may be fabricated to have a groove-like buried portion 111a corresponding to the power supply line 113a on the upper side of the base material 111 to separately manufacture the base material 111, and the power supply line 113a of the EL sheet 113 may be inserted in the buried portion 111a and coupled.

The base material 111 may be formed of various materials, but it is preferable to use a polypropylene (PP) material which is widely used because of easy processing and low cost.

Here, the PP material is one of the thermoplastic general-purpose resins, and has the advantage of heat resistance, excellent chemical resistance, and high rigidity.

Figure 4:
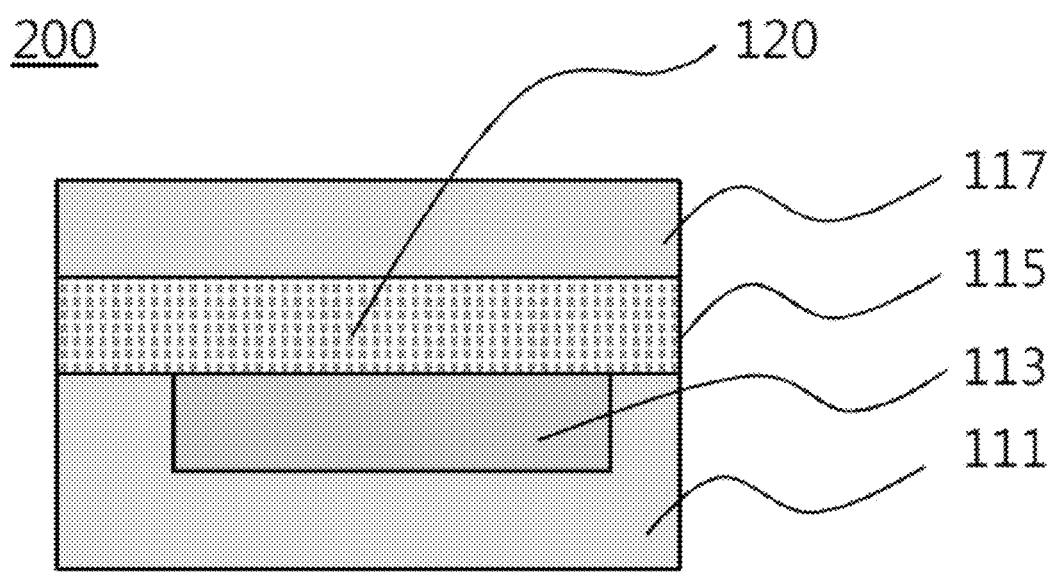
FIG. 4 illustrates a foam-injection molding structure including an EL sheet according to another exemplary embodiment of the present disclosure.

FIG. 4 illustrates a foam-injection molding structure including an EL sheet according to another exemplary embodiment of the present disclosure.

Hereinafter, another exemplary embodiment of the present disclosure is described with reference to FIG. 4. The components having the same reference numerals as those in an embodiment are the same components performing the same function and the description thereof is omitted.

The method of foam-injection molding including an EL sheet may add an additive 120 to the foam layer 115 of the TPE material.

That is, when the EL sheet 113 is not emitting light, the base material 111 or the EL sheet 113 may be exposed to the outside through the TPE foam layer 115 and the skin layer 117 which are transparent materials. To prevent this, the additive 120 such as a polarizing pigment or a fluorescent pigment may be mixed with the TPE resin and injected. Thus, it is possible to improve the beauty of the appearance. In addition, the exposure of the base material or the EL sheet may be prevented by controlling the permeability of the skin layer.

Referring to FIG. 4, the foam-injection molding structure 200 including an EL sheet according to another exemplary embodiment of the present disclosure may include the base material 111, the EL sheet 113 disposed on the upper side of the base material 111, the foam layer 115 disposed on the upper side of the EL sheet 113, and the skin layer 117 disposed on the upper side of the foam layer 115.

Here, the foam layer 115 may be foamed with the TPE material, and the additive 120 may be added to prevent the base material 111 or the EL sheet 113 from being exposed to the outside during the non-light emission of the EL sheet 113.

When the EL sheet 113 emits light, the additive 120 may not interfere with the transmission of light, but may perform a function of blocking the see-through phenomenon only when the EL sheet 113 does not emit light. Various materials that perform this function may be used as the additive 120. For example, a fluorescent material or a polarizing material may be used.

Since the fluorescent substance is strongly fluorescent at a specific wavelength, the light emitted from the EL sheet 113 is doubled, and when the EL sheet 113 does not emit light, it is possible to prevent a phenomenon that the EL sheet 113, which is shown from the back side of the transparent TPE layer, the base material 111, and the like are appeared.

Since only a specific wavelength passes through the polarizing material, if only the light emitted from the EL sheet 113 is allowed to pass through, it is possible to prevent the phenomenon that the EL sheet 113, which is shown from the back side of the transparent TPE layer, the base material 111, and the like are appeared when the EL sheet 113 does not emit light.

Although the additive 120 is included in the foam layer 115 in the foam-injection molding structure 200 including an EL sheet according to another exemplary embodiment of the present disclosure shown in FIG. 4, the present disclosure is not limited thereto, and the additive 120 may be included in other layer which is located outside the EL sheet 113.

For example, the skin layer 117 may be foamed to improve softness. At this time, the additive 120 may be added to the skin layer 117 material so as to foam the skin layer 117 so that it is possible to prevent the internal see-through phenomenon.

In another embodiment, the light transmittance may be changed according to a voltage applied from outside to at least one layer such as the foam layer 115, the skin layer 117, and the surface treatment layer (not shown) located above the EL sheet 113 so that it is possible to prevent the internal see-through phenomenon.

That is, when the EL sheet 113 is not emitted, a controller (not shown) may recognize this and may generate a light transmittance adjusting signal to lower the light transmittance to a predetermined value or less, thereby solving the problem of internal see-through phenomenon.

Figure 5:
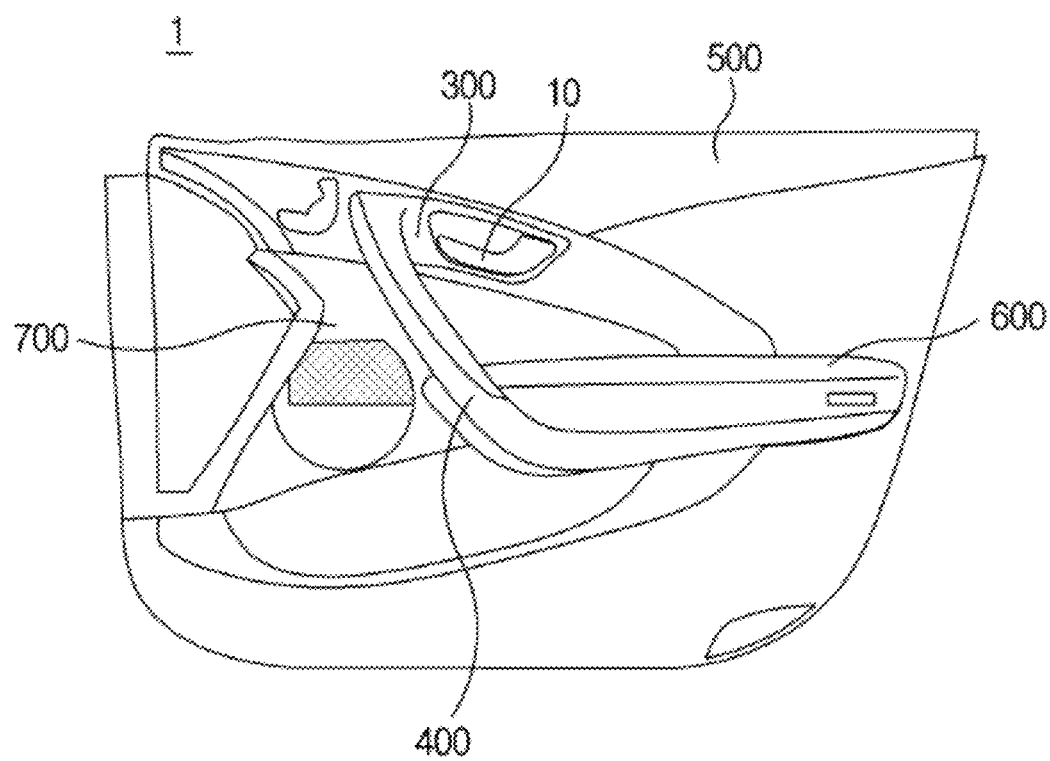
FIG. 5 illustrates an example in which a foam-injection molding structure including an EL sheet according to an exemplary embodiment of the present disclosure is mounted in a vehicle.

FIG. 5 illustrates an example in which a foam-injection molding structure including an EL sheet according to an exemplary embodiment of the present disclosure is mounted in a vehicle, which may be installed in a garnish 300 or a side grip 400, a door upper trim 500, a door armrest 600, and a door center panel 700.

The garnish 300 refers to a part which is mounted around a handle unit 10 for opening and closing the door to determine the boundary of the handle unit 10 in a side door trim 1. In addition, the side grip 400 refers to a part which is installed to protrude annularly in parallel with the inside door trim 1 from one side of the inside door trim 1 heading for the inside of the vehicle so that the passenger may pull the door with one hand and close the door.

The door upper trim 500 is a part which is located at the upper end of the door trim. The door armrest 600 is a part protruding from the middle of the door trim so as to rest the passenger's arm. The center panel 700 is a part for supporting the side of the armrest. Since it is an area that contacts the skin of a passenger, it is usually configured of a soft trim structure with a foam layer.

The foam-injection molding structure including an EL sheet according to an exemplary embodiment of the present disclosure may be mounted in various positions in a vehicle.

When it is mounted in the garnish 300 shown in FIG. 5, the handle unit 10 may be easily recognized even when the surroundings are dark at the time of getting off. In addition, when it is mounted in the side grip 400, the interior decoration may be improved, and the vicinity of the door may be lighted at the time of getting on or off, thereby improving convenience in getting on and off.

In addition, the foam-injection molding structure including an EL sheet according to an exemplary embodiment of the present disclosure may improve the soft touch by providing the foam layer 115.

As described above, the exemplary embodiments of the present disclosure may be mounted in the interior of the vehicle, and a luxurious sensation of sight and tactile sense may be endowed to the user, thereby enhancing the visual/tactile emotional quality.

According to the present disclosure, by providing an EL sheet in a vehicle interior material, it is possible to enhance the interior decoration effect by emitting a predetermined portion inside the vehicle.

Further, according to the present disclosure, by including the foam layer, the soft feeling of the vehicle interior material may be improved and the emotional quality may be improved.

In addition, in the case of door trim, the existing mood lighting area is not limited to a hard panel having no cushion layer such as garnish, grip handle, bezel, and the like, but may be extended to a soft panel (door upper trim, arm rest, etc) having a cushion layer and a skin layer.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A structure of foam-injection molding, the structure comprising:
   a base material;
   an electro luminescence (EL) sheet which is able to emit a light, and which is disposed on an upper side of the base material;
   a foam layer disposed on an upper side of the EL sheet;
   a skin layer disposed on an upper side of the foam layer; and
   a surface treatment layer disposed on an upper side of the skin layer.

2. The structure of claim 1, wherein the skin layer is formed of a material capable of adjusting transmittance.

3. The structure of claim 1, wherein the surface treatment layer is formed of a material capable of adjusting transmittance.

4. The structure of claim 1, wherein the skin layer is formed by performing foaming.

5. The structure of claim 1, wherein the foam layer is formed of a thermoplastic elastomer (TPE) material.

6. The structure of claim 1, wherein the EL sheet is installed at one side of an interior of a door trim of a vehicle to emit a light when a user gets on or off the vehicle.

7. The structure of claim 1, wherein a power line is embedded in an upper end of the base material.

8. The structure of claim 7, wherein the base material is formed of a hard material.

9. The structure of claim 1, wherein the foam layer contains an additive for preventing exposure of the base material or the EL sheet when the EL sheet does not emit a light.

10. The structure of claim 9, wherein the additive is a fluorescent material or a polarizing material.

11. A method of foam-injection molding, the method comprising:
    forming a base material;
    forming an electroluminescence (EL) sheet capable of emitting light on an upper side of the base material;
    forming a foam layer on an upper side of the EL sheet; and
    forming a skin layer on an upper side of the foam layer, wherein the skin layer is preheated and embossed on an inside of the mold.

12. The method of claim 11, wherein the skin layer is formed by a foam injection.

13. The method of claim 11, wherein the base material and the EL sheet are mounted inside a mold after the EL sheet is bonded to the base material.

\* \* \* \* \*